Nov. 18, 1969    P. J. BREWINGTON    3,478,368
FLUSH VALVE ASSEMBLY
Filed Dec. 18, 1967    2 Sheets-Sheet 1
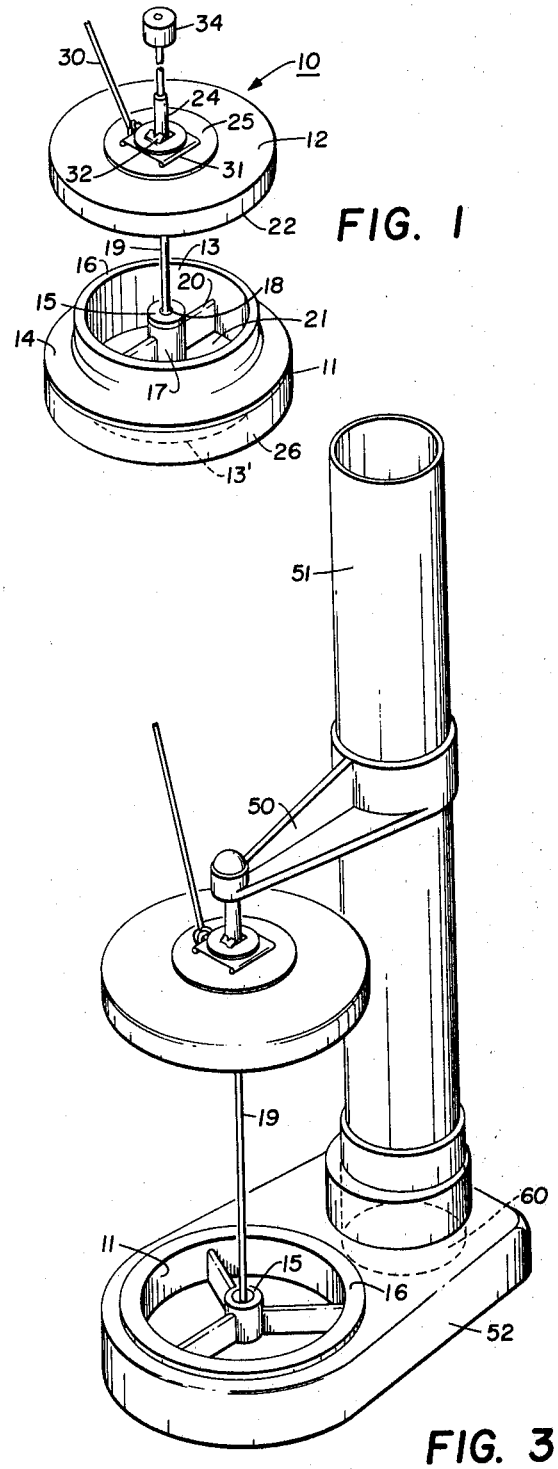
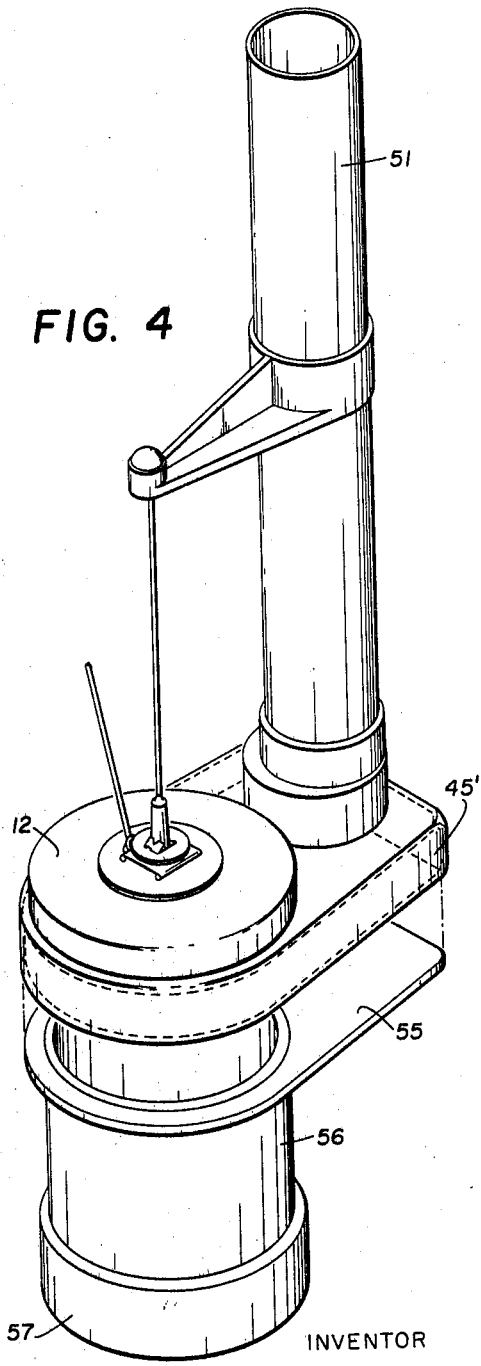
INVENTOR
PHILIP J. BREWINGTON
Kenneth R. Glaser
ATTORNEY

INVENTOR
PHILIP J. BREWINGTON

ATTORNEY

United States Patent Office 3,478,368
Patented Nov. 18, 1969

3,478,368
FLUSH VALVE ASSEMBLY
Philip J. Brewington, 6902 Manshaca Road,
Austin, Tex. 78745
Filed Dec. 18, 1967, Ser. No. 691,537
Int. Cl. E03d 1/34
U.S. Cl. 4—57                                    11 Claims

ABSTRACT OF THE DISCLOSURE

Disclosed is a flush valve assembly, the two basic portions being a dual seat arrangement and a valve seal or closure member which rests firmly against the dual seats when the valve is closed. The valve seal may be fabricated of soft flexible polyvinyl chloride foam. A recess in one of the seats receives a guide wire on which the valve seal slides. The valve assembly is illustrated separately, as part of a composite unit including a base portion and pipe, and incorporated into original equipment which is mounted within a standard flush tank.

---

This invention relates to flush valve assemblies, and particularly to flush valve assemblies which can be utilized in conjunction with old flush valves having worn parts without the necessity of replacing the worn flush valve.

Within the plumbing field there exists the need for reliable and inexpensive flush valve assemblies which may be easily installed and are relatively free of maintenance problems. Conventional valve assemblies include a ball closure seal, usually of rubber, which is adapted to rest on a valve seat at the upper end of the discharge pipe. The difficulty with these assemblies is that, with time, both the rubber ball and the valve seat become worn, and if not entirely replaced, results in not only a large waste of water, but interference with the proper functioning of the toilet due to the substantial water leakage.

While replacement of the ball seal is a relatively simple matter, to repair or replace the worn valve seat often requires the complete dismantlement of the flush tank in which the valve seat is located, involving not only time and expense, but a considerable amount of trouble.

It is therefore a primary object of the invention to provide a new and improved flush valve assembly which is reliable, requires a minimum of maintenance, and may be easily and inexpensively installed.

It is a further object of the invention to provide a flush valve assembly which may be quickly installed over an existing worn flush valve seat without the necessity of replacing the worn flush valve.

It is an even further object of the invention to fabricate the closure valve of a material which provides a tight seal when the valve is closed, thereby to prevent any leakage through the valve.

In accordance with these and other objects, the present invention provides a flush valve assembly which includes a dual seat arrangement having a pair of integrally connected coplanar seats which receive a valve seal or closure member formed of a soft flexible polyvinyl chloride foam when the valve is closed. A wire inserted into a recess of one of the seats provides a guide for the valve seal during the opening and closing of the valve. Due to the flexible nature of the closure seal, the water within the flush tank tightly presses the substantially flat face of the seal simultaneously against the two seats when the valve is closed, thereby assuring against any leakage. In accordance with alternate embodiments of the invention, the valve assembly may be utilized as a replacement unit in conjunction with the old worn seat, or may be incorporated into original equipment.

Other specific features of the present invention, as well as other objects and advantages will become apparent from the following detailed description taken in conjunction with the drawings, in which:

FIGURE 1 is a pictorial view of the valve assembly of the invention;

FIGURE 3 is a pictorial view of another embodiment of the invention; and

FIGURE 4 is a pictorial view, partially exploded, of another embodiment of the invention, illustrating the incorporation of the valve assembly into a piece of original equipment.

Figure 2:
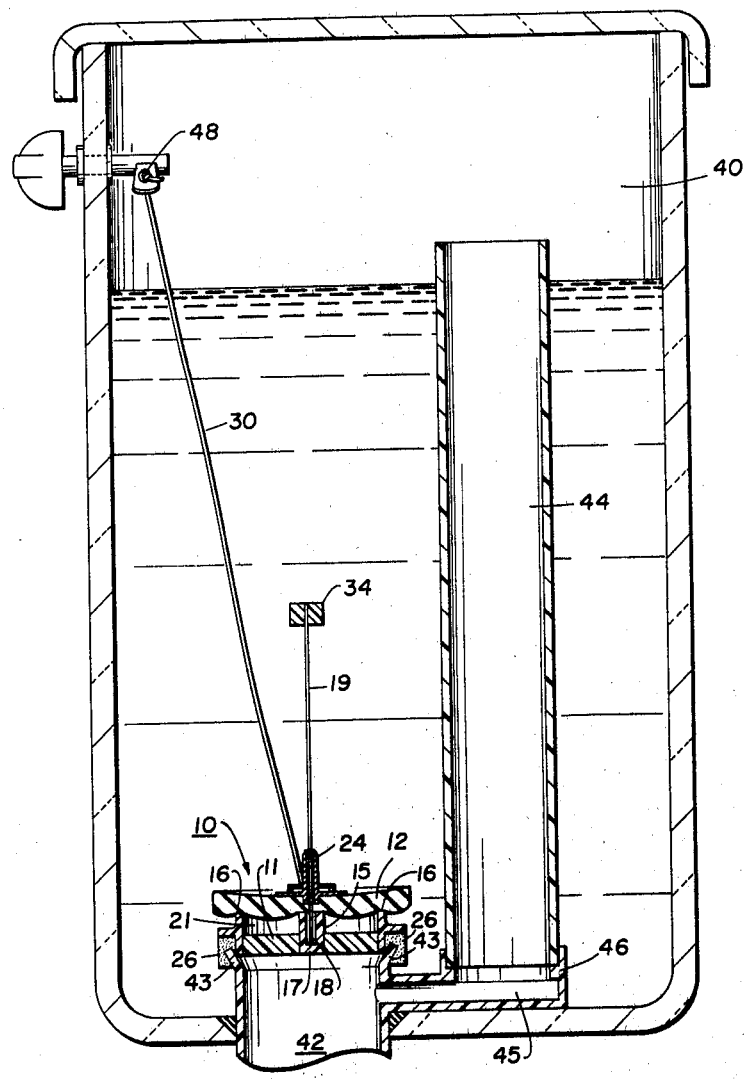
FIGURE 2 illustrates the use of the invention as a replacement valve unit, and includes a sectional view of the valve assembly of FIGURE 1 taken along the section line 2—2.

The dimensions of the parts shown in the above drawings are not necessarily to scale, but in some instances have been exaggerated to emphasize particular features of the invention.

Referring now to FIGURE 1, there is depicted the valve unit 10 of the present invention comprising the dual seat arrangement 11 and companion valve seal or closure member 12. The dual seat arrangement 11 includes a first cylindrical portion 13 circumscribing an opening 21, and being flanged as at 14, and a smaller cylindrical portion 17 having a recess 18 therein for receiving one end of a guide wire 19. The cylindrical portion 17 is joined to the walls of the cylindrical portion 13 by a strut 20 and is preferably centrally disposed with respect to the walls of the portion 13. There is thus provided a pair of coplanar valve seats 15 and 16 formed by the concentric circular rims atop the cylindrical portions 17 and 13, respectively. A cohesive mass 26 of sealing compound, such as wax or a modified wax compound, surrounds the lower portion 13', of the cylindrical wall 13 adjacent to and below the flanged portion 14.

The valve seal or closure member 12 has an essentially flat, though flexible, lower surface 22. A tube 24 extends upward from and is connected with the member 12 by a plate 25. A guide wire 19 extends into the tube 24, through the valve seal 12, and into the opening 18 of the cylindrical portion 17. A stop 34, which may be of rubber or plastic, is located at the tip of the guide wire 19 to limit the extent of lift of the closure seal 12. A connector 30, which may be of wire, chain, or cord, for example, is pressed against the plate 25 by the metal fastener 32 and washer 31 combination.

The specific technique by which the connector 30 is attached to the float seal 12 is not critical to the invention, and various means may be utilized. Accordingly, an alternate arrangement might be to have the tube 24 flanged at its upper end, the connector 30 then being looped around the tube 24 and below this flanged portion.

There is now described with reference to FIGURE 2 the installation and operation of the valve assembly of FIGURE 1 as a replacement unit in conjunction with a worn flush valve within a typical toilet flush tank. Accordingly, the old parts which remain after discarding the worn ball closure include the old flush valve 42 leading from the flush tank 40 to the toilet bowl (not shown), the flush valve 42 having a worn tapered seat 43, as illustrated. A channel 45 connects the valve 42 with an overflow pipe 44 connected with the boss 46.

The replacement unit 10, including the seat arrangement 11 and closure seal 12, is ordinarily pre-assembled with the block of sealing compound 26 incorporated therewith. The guide wire 19 has been inserted into the tube 24, through the valve seal or closure member 12, and is secured within the hole 18 of the cylinder 17. The replacement seat arrangement 11 is placed on the worn seat 43 of the old valve 42, and pressed firmly in place, the block 26 of sealing compound assuring a perfect seal between the old and new seats. As an alternate technique to having the block 26 of sealing compound pre-assembled with the seat arrangement 11, it may be desirable to insert the sealing compound around the joint of the new and old seat after the unit 10 has been inserted over the old seat. The free end of the connector 30 is then attached to the flush lever 48. As a further modification it may be desirable to secure the free end of the guide wire 19 to the overflow pipe 44 by way of a suitable bracket, rather than having it disconnected, as illustrated in FIGURE 2.

In the operation of the present invention, the flush lever 48 is raised, lifting the valve seat 12 off the dual seat arrangement 11, along the axis of the guide wire 19, as shown in FIGURE 1, thus "opening" the valve 10. Water within the flush tank 40 then exists through the opening 21 and through the old flush valve 42. As the level of the water in the tank 40 drops, the seal 12, which is buoyant, correspondingly descends along the axis of the guide wire 19 until it comes to rest upon the valve seat arrangement 11. It is to be particularly noted that when the valve seal 12 comes to rest the lower surface 22 firmly engages both of the seats 15 and 16 simultaneously since these seats are coplanar. Thus, the opening 21 is tightly sealed, and any water flowing into the hole through which the guide wire 19 passes through the valve seal 12 is prevented from leaking through the valve opening 21 into the toilet bowl.

In accordance with a specific feature of the present invention, the valve seal or closure 12 is fabricated of a soft and flexible material which conforms to the configuration of an object to which it is pressed. Consequently, when he seal 12 is urged against the dual seats 15 and 16 by the pressure of the water in the tank 40, the conformation of the surface 22 to the seats assures as exceptionally tight seal. In accordance with this material requirement, polyvinyl chloride foam has proven to be very suitable for this purpose, for not only does it possess the required softness and flexibility ofr the just-stated purpose, but also is buoyant in water, and is both water and acid resistant.

As previously described, the valve assembly 10 shown in FIGURE 1 may be utilized as a replacement unit in conjunction with the old flush valve and overflow pipe as illustrated in FIGURE 2. In accordance with another embodiment of the invention, the valve seat arrangement 11 including dual seats 15 and 16, is integrally formed with a new pipe 51 through a common base 52, as illustrated in FIGURE 3. A guide bracket 50 is connected with the pipe 51 and provides an anchor for the guide wire 19. The entire assembly of FIGURE 3 can then be installed in the flush tank 40 of FIGURE 2 by slipping the pipe 51 over the old overflow pipe 44, the new seat unit 11 being positioned as before over the old flush valve. The pipe 51 and base unit 52, in addition to providing an anchor for the guide wire 19, allow for an extremely secure installation in the tank 40. Alternatively, the old overflow pipe 44 may be removed, and the opening 60 of the pipe 51 aligned with the protuberance or boss 46, the pipe 51 thereby providing a new overflow pipe. Sealing compound around both the opening 60 and the boss 46 assures a water-tight seal at this location also.

As a still further embodiment of the present invention, the composite structure illustrated in FIGURE 3 may be additionally modified as shown in FIGURE 4 by adding a base plate 55 to which is attached a discharge pipe 56 and associated sleeves 57 for mounting, the new channel 45′ thereby being formed. This composite unit, while still basically incorporating the structure of the valve assembly 10 described with respect to FIGURE 1, can be utilized as a piece of original equipment, rather than as a replacement unit, and can be initially installed in the flush tank 40. The pipe 56 may also be threaded, and instead of a sleeve 57, a correspondingly threaded nut and conventional gaskets may be utilized to secure the unit to the flush tank 40.

Various other modifications of the above described embodiments may become obvious to one ordinarily skilled in the art without departing from the spirit and scope of the invention as defined by the appended claims.

What is claimed is:
1. A replacement flush valve assembly to be utilized in conjunction with an old valve seat, comprising:
   (a) a valve seal being of soft and flexible material and having a substantially flat surface,
   (b) a dual seat member for receiving said valve seal; said member formed by a first cylindrical portion having at its upper surface a first rim, a second cylindrical portion having at its upper surface a second rim, said first and second cylindrical portions defining an opening therebetween, and being joined by a strut so that said first and second rims are coplanar with respect to one another; thereby to provide two spaced seats upon which said flat surface of the valve seal rests, and
   (c) means for securing said dual seat member to said old valve seat.

2. The assembly as described in claim 1 wherein said cylindrical portions are concentric and including a guide wire extending through said valve seal and into an aperture in the inner one of said concentric cylindrical portions, and means for lifting said valve seal off said dual valve seat and along the axis of said guide wire.

3. The assembly as described in claim 2 wherein said soft and flexible material is a polyvinyl chloride foam, and said means for securing said dual seat member to said old valve seat is a sealing compound.

4. A new toilet flush valve assembly, comprising:
   (a) a closure valve seal of soft and flexible material having two major surfaces, a tubular member connected to one major surface, the other major surface being substantially flat,
   (b) a dual seat arrangement including a first cylindrical portion defining a first opening and having at its upper surface a first circular rim, a second cylindrical portion defining a second opening and having at its upper surface a second circular rim, said cylindrical portions being connected by a strut so that said first and second rims provide a pair of coplanar concentric seats for receiving the substantially flat surface of the said closure valve seal, and
   (c) means for lifting the said valve seal off of the said dual seat arrangement to thereby open the said flush valve assembly, whereby when the said flush valve assembly is closed, the substantially flat surface of the said valve seal simultaneously rests upon the pair of coplanar concentric seats.

5. The assembly as described in claim 4 including sealing means for securing said dual seat member to an old valve seat.

6. A replacement flush valve assembly to be utilized in conjunction with an old valve seat, comprising:
   (a) a valve seal being of soft and flexible material and having a substantially flat surface,
   (b) a dual seat member for receiving said valve seal, said member formed by a first cylindrical portion having at its upper surface a first rim, a second cylindrical portion having at its upper surface a second rim, said first and second cylindrical portions being joined by a strut so that said first and second rims are coplanar with respect to one another, thereby to provide two seats upon which said flat surface of the valve seal rests,
   (c) a vertical pipe joined with said dual seat member by a base portion,
   (d) a guide bracket connected with said vertical pipe,
   (e) a guide wire having one end extending through said valve seal and into an aperture in one of said cylindrical portions, the other end of said guide wire inserted in said guide bracket, (f) means for lifting said valve seal off said dual valve seat and along the axis of said guide wire, and (g) means for securing said dual seat member to said old valve seat.

7. The assembly as described in claim 6 wherein said soft and flexible material is a polyvinyl chloride foam, and said means for securing said dual seat member to said old valve seat is a sealing compound.

8. A new flush valve assembly to be installed within a flush tank, comprising:
   (a) a base member,
   (b) a portion of said base member forming a dual seat arrangement, said dual seat comprising a pair of concentric coplanar rims, thereby to provide a pair of valve seats,
   (c) a valve closure seal,
   (d) a guide wire passing through said valve closure seal having one end secured within an aperture defined by one of said valve seats,
   (e) a vertically disposed pipe connected with another portion of said base member,
   (f) a guide bracket connected with the said vertically disposed pipe, the other end of said guide wire secured with said guide bracket, and
   (g) a base plate having another pipe member connected therewith, and affixed to said base member to provide a channel extending from a point below said vertically disposed pipe to a point below said dual seat arrangement.

9. The assembly as described in claim 8 wherein said valve closure seal is of a soft and flexible material.

10. A replacement flush valve, comprising:
    (a) a dual seat member adapted to be secured to a worn valve seat, said dual seat member formed by a pair of concentric rims defining two spaced seats with an opening therebetween through which water may flow, said first and second rims being integrally joined by a strut,
    (b) the inner one of said rims having a recess in a top face thereof into which a guide wire extends,
    (c) a valve seal of soft and flexible material centrally disposed over said dual seat member, said guide wire extending through the center of said valve seal, the valve seal thereby being adapted to be raised and lowered into respective engagement and disengagement with said dual seat member along said guide wire, a bottom surface of said valve seal engaging the entire top faces of both of the said concentric rims when at its lowermost position, and (d) means attached to said valve seal for raising said valve seal from engagement with said dual seat member.

11. A new flush valve assembly to be installed within a flush tank, comprising:
    (a) a base member,
    (b) a dual seat arrangement integrally incorporated with said base member, said dual seat arrangement formed by a pair of concentric cylindrical portions defining first and second spaced rims with an opening therebetween, thereby to provide a pair of valve seats,
    (c) a valve closure seal centrally disposed over said dual seat arrangement, said valve closure seal having a bottom surface adapted to engage substantially the entire respective top surfaces of both spaced rims when the valve closure seal is at its lowermost position,
    (d) a guide wire passing through said valve closure seal and having one end secured within a recess in the top face of the inner one of said rims,
    (e) a vertically disposed pipe connected with said base member at a location laterally spaced from said dual seat arrangement,
    (f) a guide bracket connected with said vertically disposed pipe, the other end of said guide wire secured in said guide bracket,
    (g) a base plate affixed to said base member so as to define a channel extending from a first location below said vertically disposed pipe to a second location below said opening between the spaced rims, and
    (h) another pipe communicating with said channel at said second location.

References Cited

UNITED STATES PATENTS

| | | | |
|---|---|---|---|
| 425,921 | 4/1890 | White | 4—58 |
| 1,952,583 | 3/1934 | Coltman | 4—53 |
| 2,689,352 | 9/1954 | Pegler | 4—67 XR |
| 2,705,808 | 4/1955 | Crockett | 4—57 |
| 2,773,268 | 12/1956 | Pitts | 4—60 |
| 3,172,129 | 3/1965 | Fulton et al. | 4—60 |
| 3,302,217 | 2/1967 | Schrock | 4—57 |

FOREIGN PATENTS 861,036  2/1961  Great Britain.

LAVERN D. GEIGER, Primary Examiner

HENRY K. ARTIS, Assistant Examiner